UNITED STATES PATENT OFFICE.

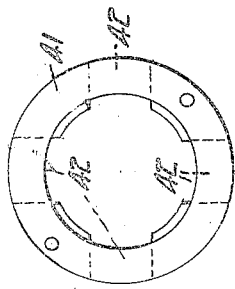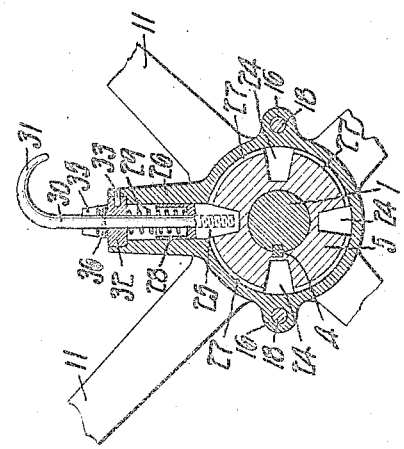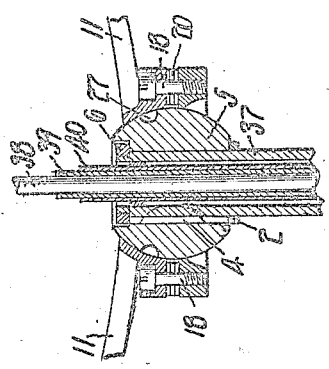

EDWARD H. VINCENT, OF DETROIT, MICHIGAN.

SHIFTABLE STEERING-WHEEL.

1,269,341.
Specification of Letters Patent.
Patented June 11, 1918.

Application filed September 14, 1916. Serial No. 119,996.

*To all whom it may concern:*

Be it known that I, EDWARD H. VINCENT, a citizen of the United States, and residing at Detroit, in the county of Wayne and State of Michigan, have invented a new and Improved Shiftable Steering-Wheel, of which the following is a specification.

It is common practice to attach to the steering rods of motor vehicles steering wheels which are slidable transversely of the axis of the rod, or are tiltable about an axis at right angles to that of the rod, or which are capable of both of these motions—the object being to secure clearance for the driver in getting into or leaving the seat. These constructions are, however, objectionable in that, in order to obtain clearance, it is necessary to have the front wheels turned substantially straight ahead which is often impractical; for example, when standing at the curb.

The object of the present invention is to provide a steering wheel wherein the proper clearance to permit the driver to move freely may be obtained regardless of the position occupied by the front wheels of the vehicle; and to this end it consists in a steering wheel so mounted upon a steering rod as to be capable of moving directly forward when the latch mechanism, whereby they are normally locked together, is released. It also consists in a steering wheel so mounted upon the steering rod as to be capable of turning about the axis of the latter when the latch mechanism is released and being further capable of another movement (as shown, a tilting movement) in reference to the steering rod. In the embodiment shown these movements may be simultaneous. The invention also consists in the details of construction shown, described and claimed.

In the drawings, Figure 1 is a vertical section showing one embodiment of the invention. Fig. 2 is a fragmentary section on the line 2—2 of Fig. 1. Fig. 3 is a fragmentary section through a modification. Fig. 4 illustrates both in plan and cross-section a modified form of clamping ring.

Like reference characters indicate like parts.

Referring to Figs. 1 and 2, the usual solid steering rod 1 has its upper end portion either slightly tapered or provided with a collar or seat 2 and terminating in a reduced threaded portion 3 as is customary. The rod is also slotted to receive a key 4 whereby a head 5, which is retained in seated engagement with the collar 2 by a nut 6 screwed on the portion 3, is prevented from turning angularly in respect to the rod. The outer surface of the head 5 is spherical.

Mounted on the head is a steering wheel, the rim 10 and spokes 11 of which may be of any suitable construction. The spokes merge into a hub 12, the inner surface of which is substantially hemi-spherical to conform closely to the upper half of the head; and below the plane which lies at right angles to the axis of the steering rod and passes through the center of the head, is a ring 15 a portion of the inner surface of which also conforms closely to the surface of the head. Lugs 16 on the hub are perforated and countersunk to receive the adjusting screws 18 that are threaded into corresponding lugs 19 on the member 15, whereby the ease with which the wheel may tilt upon the head may be determined. Soft washers or gaskets 20 of proper thickness may be interposed between the lugs and may extend entirely around the head. For the purpose of allowing an increased amount of tilting of the wheel, the lower inner portion of the ring is cut away as indicated at 22.

The head is shown provided with a series of sockets 24, preferably tapered, each of which is adapted to receive the conical end 25 of a latch plunger which is seated in a hollow boss 26 formed on the head; and the sockets may be connected by a shallow groove 27. In some instances but one socket may be used. As shown, the plunger includes a head having a substantially cylindrical body portion 28 (the rear end of which is bored out to receive a coil spring 29) and a rod 30 (the outer end of which forms a finger grip 31) which is screwed into the portion 28 and passes through the spring 29 and through the plug 32, the latter preferably being retained in the enlarged outer end of the opening in the boss by a pin 33. The plug is also preferably slotted at 35 to receive a cross-pin 36 that passes through the rod 30 and prevents axial rotation whereby an easy gripping of the finger piece 31 is insured.

In use, even when the front wheels are turned in sharply toward the curb, it is only necessary, in order to tilt the wheel directly away from the driver to secure maximum clearance, to release the latch. The wheel, upon being tilted back toward normal position, brings the latch into registration with the groove 27, after which a slight rotation of the wheel about the axis of the rod registers the latch with one of the sockets. Obviously the groove might extend partly around the head or might be omitted.

The modification shown in Fig. 3 differs from that heretofore described merely in that the top of the hub 12 is removed and the steering rod 37 made hollow to allow the passage of the various engine control rods and tubes 38, 39 and 40, the upper ends of which are provided with suitable operating levers (not shown) in the usual way.

Referring to Fig. 4, the lower side of the clamping ring 41, which corresponds to the ring 15, is notched at a series of points 42 (the widths of the notches preferably being greater than the diameter of the steering rod) whereby the angle which the wheel may be tilted is increased. The number of the notches may obviously be varied. In use the latch is released and the wheel is swung about the axis of the rod until one of these notches is directly in front of the latter, after which the wheel is tilted; and, upon the driver resuming his seat, a reversal of the motions results in the wheel becoming operatively connected to the head as before.

It is clear that many changes may be made in the details of construction without departing from the spirit of my invention; I do not, therefore, wish to be limited otherwise than as indicated by the subjoined claims.

I claim:—

1. In combination, a steering rod for a motor vehicle, a head mounted thereon, a steering wheel carried by the head, latch means whereby the rod is normally caused to rotate with the wheel, said wheel being capable of angular movement about the rod when the latch means is in inoperative position, said wheel also having another movement in respect to the rod at an angle to the first mentioned movement.

2. In combination, a steering rod for a motor vehicle, a head mounted thereon, a steering wheel carried by the head, latch means whereby the rod is normally caused to rotate with the wheel, said wheel being capable of angular movement about the axis of the rod when the latch means is in inoperative position, said wheel also being tiltable at an angle to the axis of the rod whereby clearance is obtained.

3. In combination, a steering rod for a motor vehicle, a head mounted thereon, a steering wheel carried by the head, latch means whereby the rod is normally caused to rotate with the wheel, said wheel being capable of universal angular movement in respect to said rod when the latch means is in inoperative position.

4. In combination, a steering rod for a motor vehicle, a head mounted thereon, a steering wheel carried by the head, latch means whereby the rod is normally caused to rotate with the wheel, said wheel being capable of universal angular movement in respect to said head when the latch means is in inoperative position.

5. In combination, a steering rod for a motor vehicle, a spherical head mounted thereon, a steering wheel carried by the head, latch means whereby the head is normally caused to rotate with the wheel.

6. In combination, a hollow steering rod for a motor vehicle, a hollow head mounted thereon, said steering rod and said head being arranged to allow the passage of controlling mechanism for the vehicle passing up through the rod, a steering wheel carried by the head, latch means whereby the rod is normally caused to rotate with the wheel, said wheel being capable of angular movement about the axis of the rod when the latch means is in inoperative position, said wheel also having another movement in respect to the rod at an angle to the first mentioned movement.

7. In combination, a hollow steering rod for a motor vehicle, a hollow head mounted thereon, said steering rod and said head being arranged to allow the passage of controlling mechanism for the vehicle passing up through the rod, a steering wheel carried by the head, latch means whereby the rod is normally caused to rotate with the wheel, said wheel being capable of angular movement about the axis of the rod when the latch means is in inoperative position, said wheel also being tiltable at an angle to the axis of the rod whereby clearance is obtained.

8. In combination, a hollow steering rod for a motor vehicle, a hollow head mounted thereon, said steering rod and said head being arranged to allow the passage of controlling mechanism for the vehicle passing up through the rod, latch means whereby the rod is normally caused to rotate with the wheel, said wheel being capable of universal angular movement in respect to said rod when the latch means is in inoperative position.

9. In combination, a hollow steering rod for a motor vehicle, a hollow spherical head mounted thereon, a steering wheel mounted on the head, said steering rod and said head being arranged to allow the passage of controlling mechanism for the vehicle, latch means whereby the head is normally caused to rotate with the wheel.

10. In combination, a steering rod for a motor vehicle, a spherical head mounted thereon, a steering wheel mounted on the head, said head having a groove and a socket therein, and latch means carried by the wheel, said latch means including a plunger adapted to be received in the groove and to be guided thereby into the socket.

11. In combination, a steering rod for a motor vehicle, a spherical head mounted thereon, a steering wheel mounted on the head, said head having a circumferential groove and a plurality of sockets in communication with the groove, and latch means carried by the wheel, said latch means including a plunger adapted to be received in the groove and to be guided thereby into either of the sockets.

EDWARD H. VINCENT.